Oct. 3, 1950

J. F. HOUDEK, JR 2,524,350

TELEPHONE SET WITH MEANS FOR ADJUSTING ITS ANTISIDETONE CIRCUIT

Original Filed July 13, 1945

5 Sheets-Sheet 1

Inventor:
Joseph F. Houdek Jr.
By C. A. Soper
Atty.

Inventor:
Joseph F. Houdek Jr.
By C. G. [signature]
Atty

Oct. 3, 1950 J. F. HOUDEK, JR 2,524,350
TELEPHONE SET WITH MEANS FOR ADJUSTING
ITS ANTISIDETONE CIRCUIT
Original Filed July 13, 1945 5 Sheets-Sheet 3

Inventor:
Joseph F. Houdek Jr.
By C. A. Soper
Atty.

Oct. 3, 1950

J. F. HOUDEK, JR

TELEPHONE SET WITH MEANS FOR ADJUSTING ITS ANTISIDETONE CIRCUIT 2,524,350

Original Filed July 13, 1945

5 Sheets-Sheet 4

Inventor:
Joseph F. Houdek Jr.
By C. L. Soper
Atty.

TELEPHONE SET WITH MEANS FOR ADJUSTING ITS ANTISIDETONE CIRCUIT

Original Filed July 13, 1945

Inventor:
Joseph F. Houdek Jr.
By C. P. Soper
Atty

Patented Oct. 3, 1950

2,524,350

UNITED STATES PATENT OFFICE 2,524,350

TELEPHONE SET WITH MEANS FOR ADJUSTING ITS ANTISIDETONE CIRCUIT

Joseph F. Houdek, Jr., Chicago, Ill., assignor to Kellogg Switchboard and Supply Company, Chicago, Ill., a corporation of Illinois Original application July 13, 1945, Serial No. 604,856. Divided and this application April 26, 1946, Serial No. 665,042

13 Claims. (Cl. 179—81)

This application is a division of my application, Serial No. 604,856, filed July 13, 1945.

This invention relates to telephone sets such as are installed at subscriber stations.

Its general object is to provide an improved constructional arrangement permitting use of the same basic assemblage to meet a wide variety of station requirements imposed by the varying lengths and electrical characteristics of subscriber lines and imposed by varying character of the central-office equipment.

A further object is to provide a telephone set of the general character set forth which includes a base assembly which, together with a cord-attached hand telephone and a suitable housing, comprises a complete telephone set to which the necessary conductors may be attached according to any one of a number of specific requirements.

One feature of the invention is that a telephone set constructed in accordance therewith can be used alternatively as a local-battery set and as a common-battery set; that it is adapted to one use or the other according to which of two specifically different induction-coil blocks is incorporated therein; and that the telephone set for each such use is anti-sidetone in operation.

A further feature is that the set, when adapted for common-battery use, is readily adaptable for use on lines of widely varying lengths and electrical characteristics. According to this feature, a local resistor is so located in the circuit arrangement of the set that it can be included alternatively as a part of the line resistance and as a part of the resistance of the anti-sidetone balancing arrangement, and can be excluded from both.

Other objects and features of the invention will appear as the description progresses.

The accompanying drawings, comprising Figs. 1 to 21, show apparatus views and circuit diagrams of telephone-set equipment constructed according to the invention.

Figure 2:
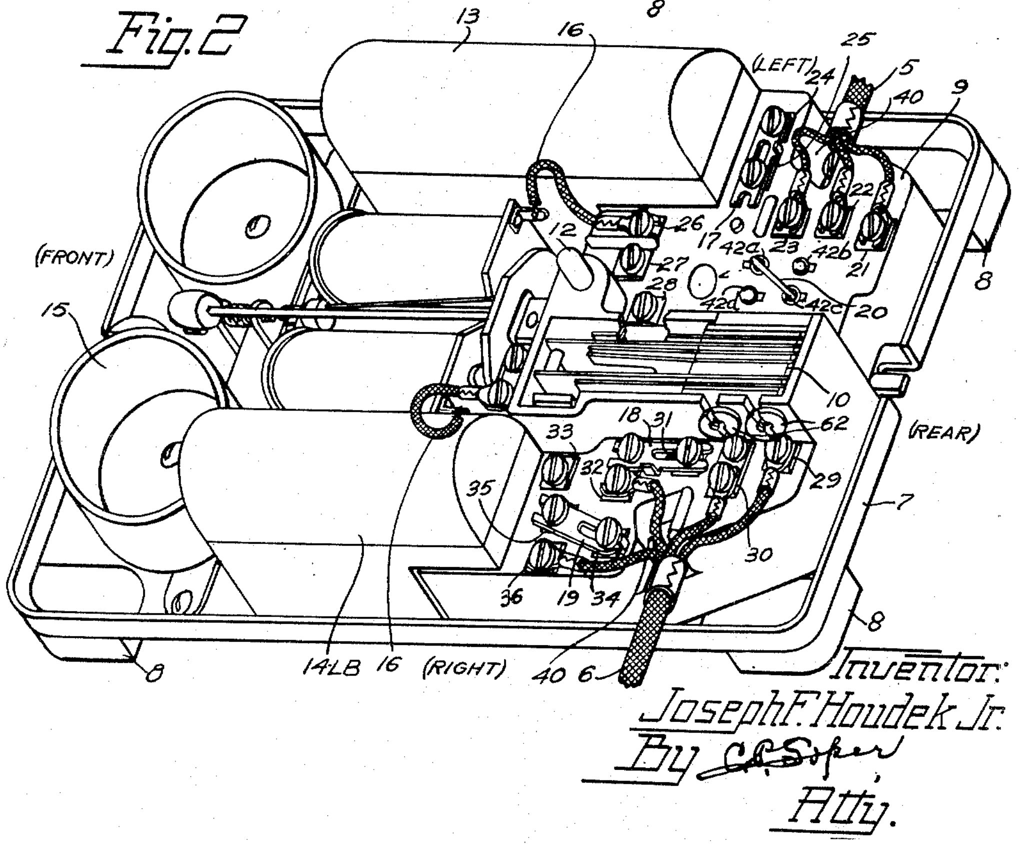
Fig. 2 is a view of the base assembly incorporated in the telephone set of Fig. 1, as seen from a point above the right rear corner thereof.
Figure 14:
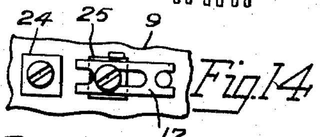
Figure 15:
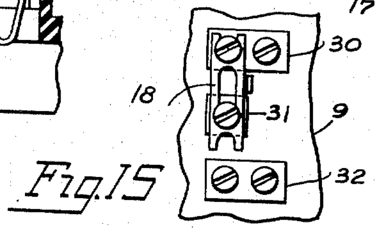

Figs. 14 and 15 show alternative positions of switching links 17 and 18 respectively of Fig. 2.

Figure 16:
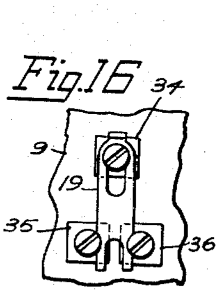
Figure 17:
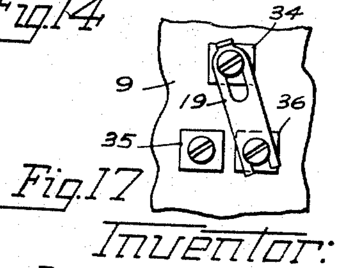

Figs. 16 and 17 show second and third positions of link 19 shown in position 1 in Fig. 2.

Figures 3, 3A, 3B, 4, 5, 6:
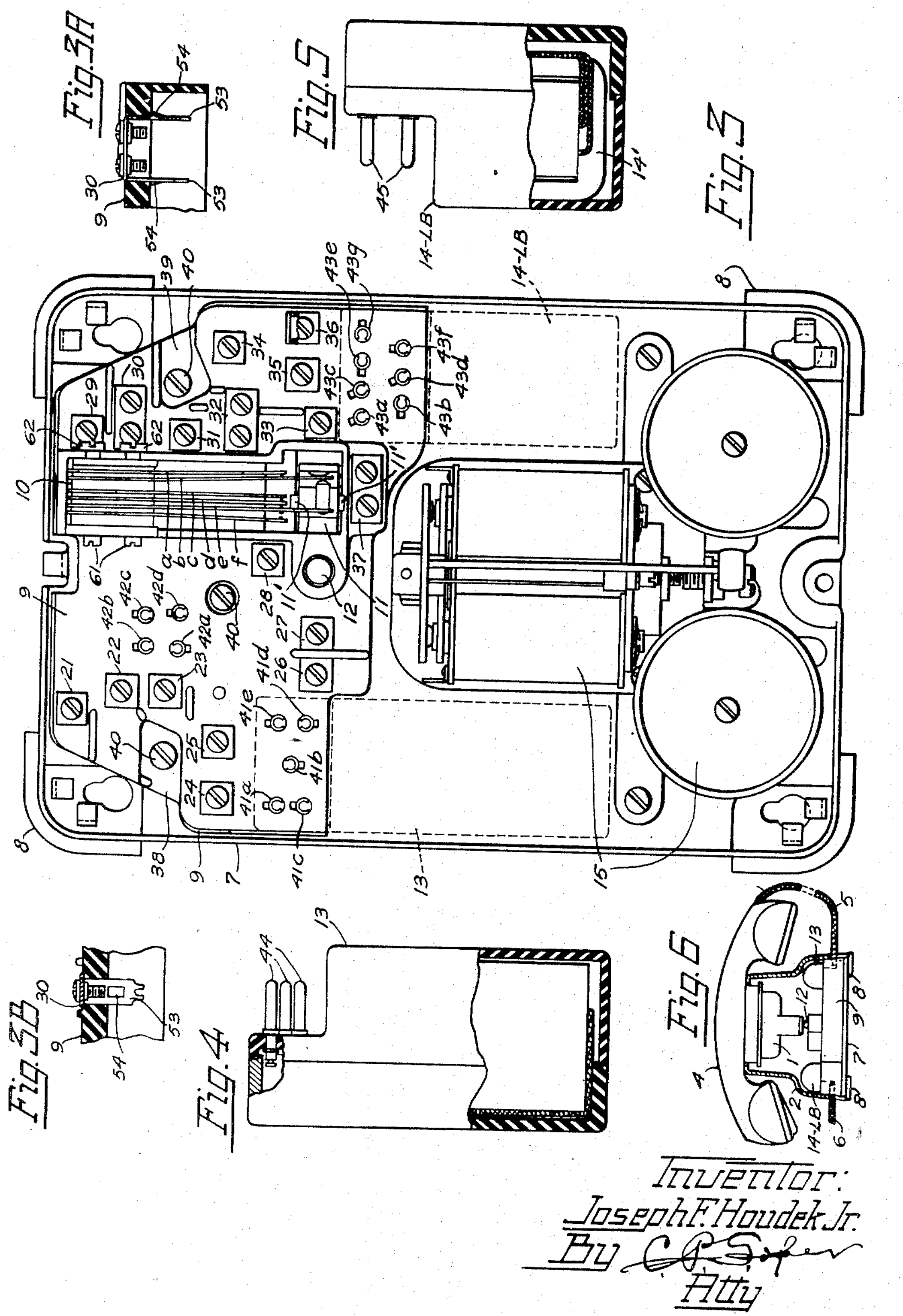
Fig. 3 is a plan view of the base assembly shown in Fig. 2, but with certain parts removed.
Figs. 3A and 3B are fragmentary views, partly in section, of certain details of construction of base block 9 of Figs. 2 and 3.
Fig. 4 is a profile view of the condenser block 13 of Fig. 2, with parts broken away to show the construction.
Fig. 5 is a profile view of induction coil block 14—LB of Fig. 2, with parts broken away to show the internal construction.
Fig. 6 is a rear view of the telephone set of Fig. 1, with the rear part of the housing broken away.
Figure 18:
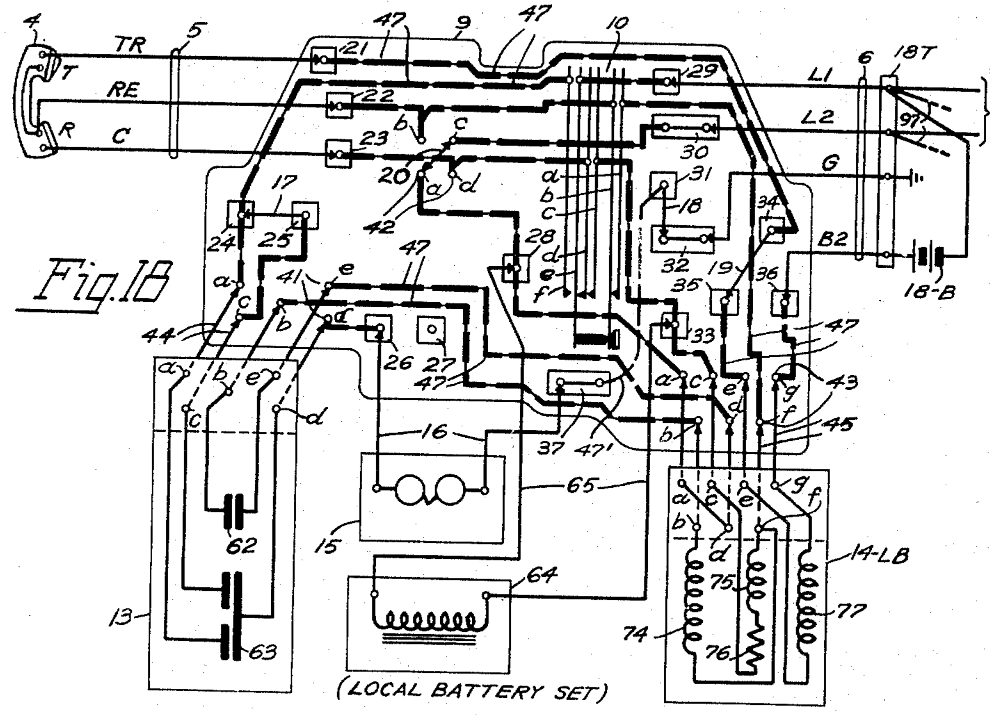

Fig. 18 is a circuit diagram of the subset adapted for local-battery talking by the inclusion of coil block 14—LB of Figs. 2 and 5, and further adapted for common-battery signalling by the inclusion of a bridging retard coil 64.

Figure 19:
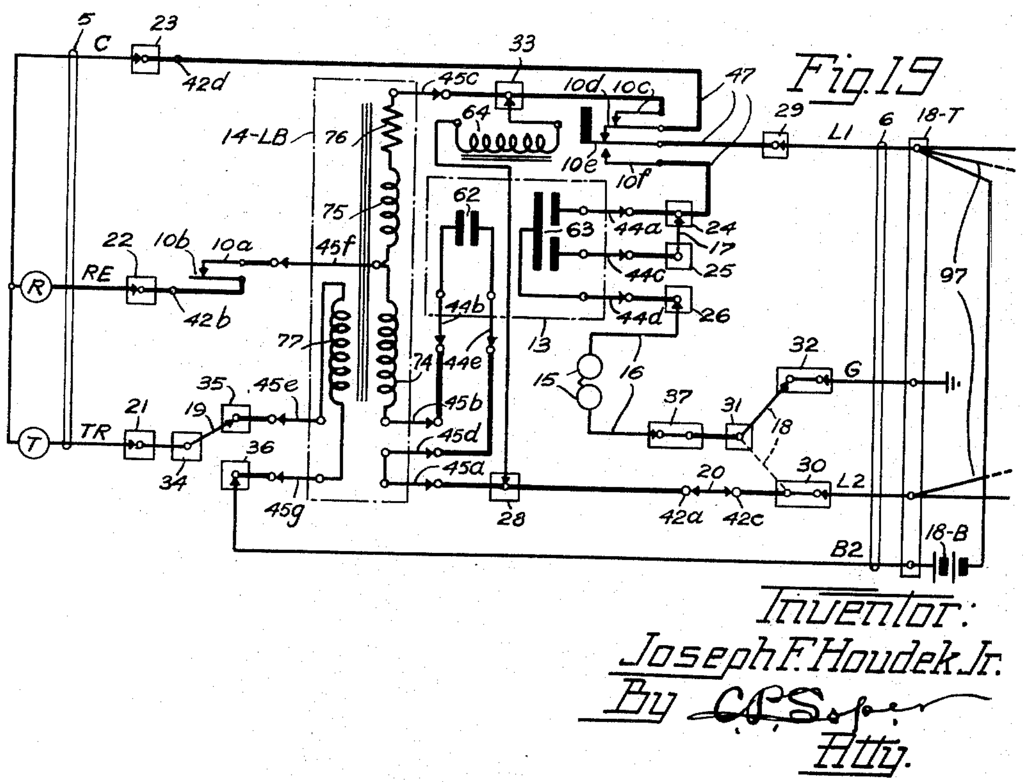

Fig. 19 is a circuit schematic of the arrangement shown in wiring-diagram form in Fig. 18.

Figure 20:
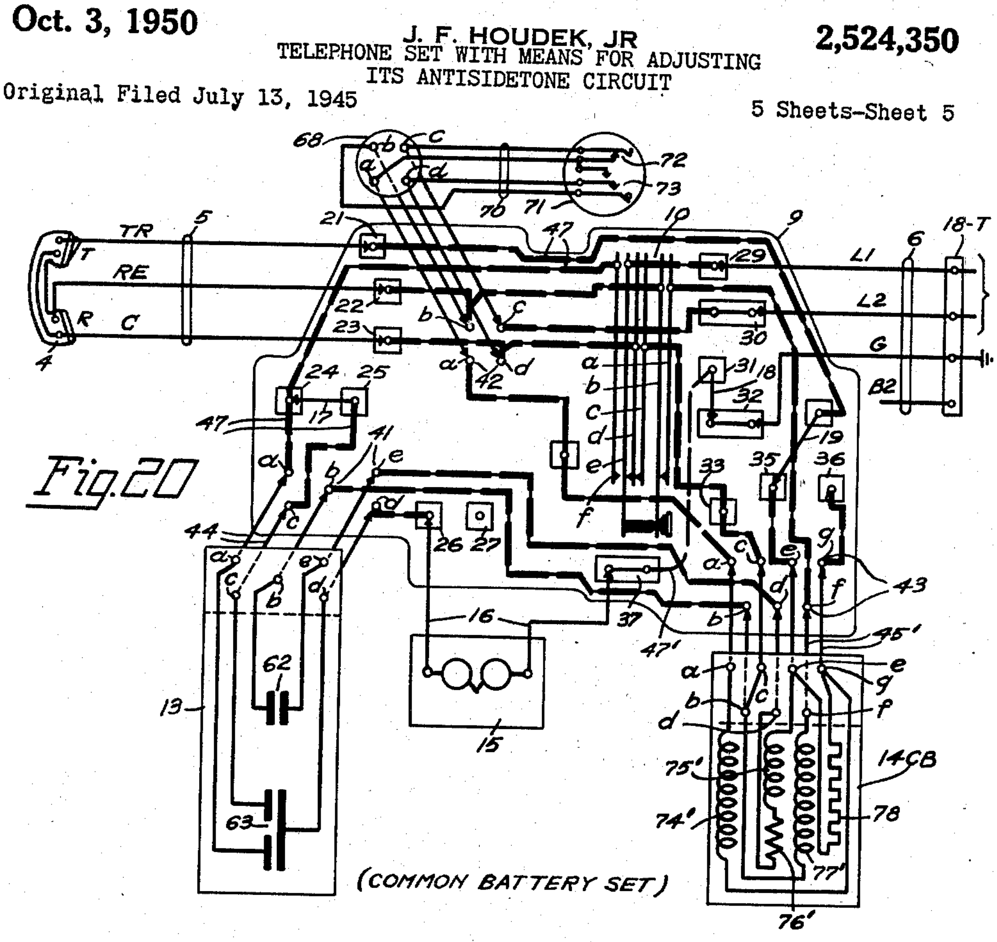

Fig. 20 is a wiring diagram of the set adapted for common-battery talking and signalling by the inclusion of induction coil block 14—CB therein, similar physically to the local-battery coil block 14—LB, illustrated in Figs. 2 and 5, and further adapted to serve as an automatic telephone set by being provided with a calling device 71.

Figure 21:
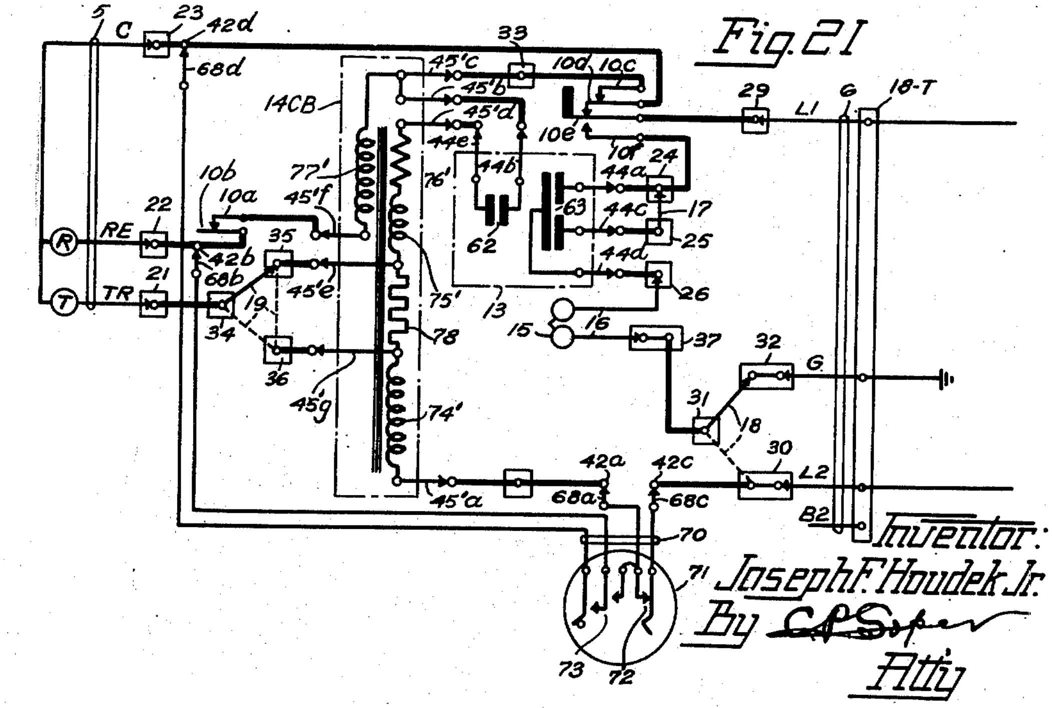

Fig. 21 is a circuit schematic of the arrangement shown in wiring-diagram form in Fig. 20.

Reference is made to the co-pending application of Clifford E. Erickson for Telephone Sets, Serial No. 594,619, filed May 19, 1945, now Patent No. 2,495,164 granted January 17, 1950, which illustrates the use of a base assembly as shown herein at Fig. 2 with a housing of one form to make up a desk set as shown herein in Fig. 1, and its use with a housing of another form to make up a wall set.

*The general arrangement*

Figure 1:
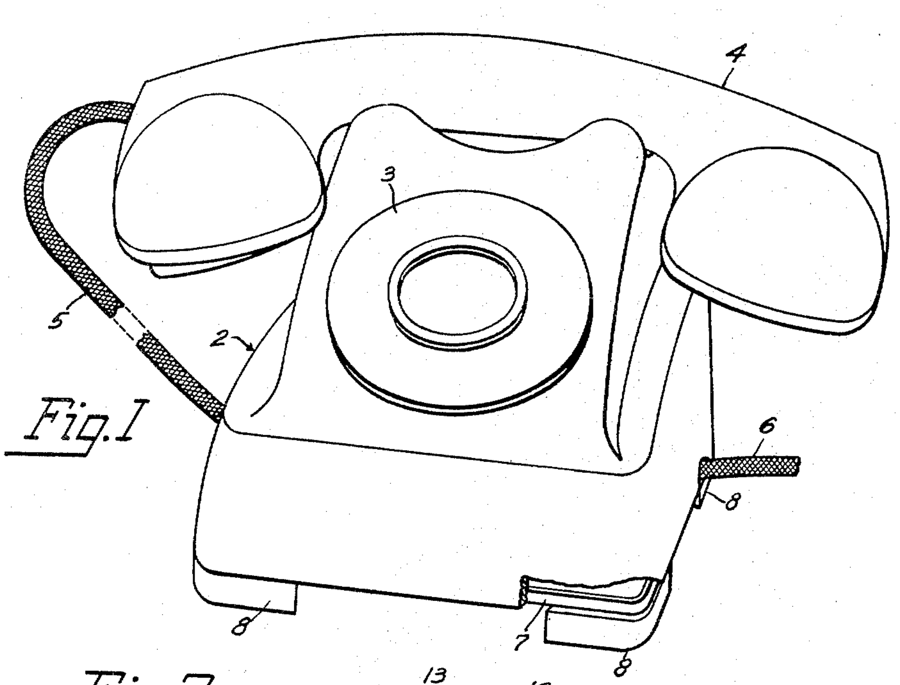
Fig. 1 is a perspective view, generally from the front, of a desk set incorporating the invention.

As shown in Fig. 1, the illustrated telephone set is supported on feet 8, attached to base plate 7. It includes the base assembly shown in Fig. 2 and a housing 2 providing a cradle within which handset 4 normally rests. Cord 5 contains three conductors interconnecting handset 4 with the base assembly. Line cord 6 contains four conductors for making all required external connections to the set.

The base assembly, shown in Fig. 2, includes base plate 7 and the parts attached thereto. These attached parts include base block 9, which carries all necessary attachment terminals for the entire set; condenser block 13; coil block 14—LB; and ringer 15. Hookswitch 10, together with its actuating parts 11 and 12, is received within a suitable opening in base block 9.

It has been chosen to illustrate the base assembly in Fig. 2 as adapted to local-battery operation. Accordingly, such assembly is equipped with local-battery induction-coil block 14—LB instead of with the generally similar common-battery induction-coil block 14—CB (Figs. 20 and 21) which differs in its arrangement and connection of coil windings to the terminals; link 19 is illustrated in its local-battery position, between terminals 35 and 34; and local battery lead B2 (not used in the common-battery set) in line cord 6 is shown connected to screw terminal 36. As will hereinafter appear, the other connections to screw terminals are similar for local-battery operation and common-battery operation.

Screw terminals are carried in base block 9 as follows: screw terminals 21 to 23 for the conductors in handset cord 5; screw terminals 29 and 30 for the line conductors contained in line cord 6; screw terminal 31 for the ground conductor in line cord 6; screw terminals 26 and 37 for flexible leads 16 attached to ringer 15; screw terminals 28 and 33, serving as attachment points for flexible leads attached to a bridging retard coil (see Fig. 18) when a local-battery set is to be adapted for common-battery signalling; screw terminals 24 and 25, provided to enable the two-position condenser link 17 to alter the condenser capacity in the ringer circuit; screw terminals 31, provided as one connection point for the two-position ringer link 18 which cooperates alternatively with a second screw in each of the double-screw terminals 30 and 32 (see also Fig. 15) to enable one ringer connection to be shifted alternatively between a line conductor and ground; and screw terminals 34 to 36, which (in the common-battery embodiment) cooperate with the three-position transmitter link 19 (see also Figs. 16 and 17) which adapts the set for operation according to the resistance of the line to which it is connected.

*The base block*

Referring now to Fig. 3, it will be noted that condenser block 13 and coil block 14—LB of Fig. 2 have been removed from the assembly and shown in side view in the associated Figures 4 and 5. The respective assembled positions occupied by these parts are shown in dotted outline in Fig. 3. The pin-socket terminals through which parts 13 and 14—LB attach, mechanically and electrically, to the base block 9 are exposed to view in Fig. 3. These pin-socket terminals include the five terminals 41*a* to 41*d* for condenser block 13 and the seven terminals 43*a* to 43*g* for coil block 14—LB.

The four pin-socket terminals 42*a* to 42*d* (Figs. 2 and 3) are provided to receive a calling-device plug when the set is used as an automatic telephone set, as in Figs. 20 and 21. When the calling device is not employed, terminals *a* and *c* in group 42 are bridged by a link 20, which may be a section of wire, bent in the form of a staple, inserted as shown in Fig. 2. Link 20 has been removed from the assembly as shown in Fig. 3.

Figure 7:
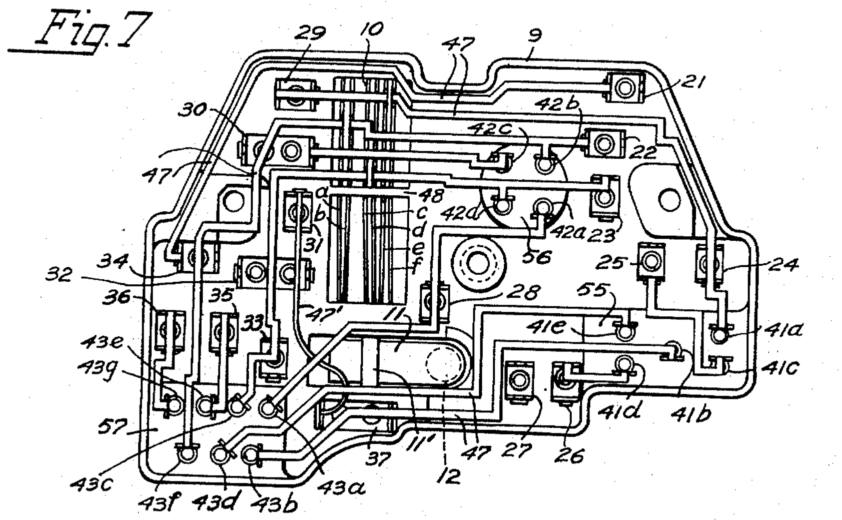
Fig. 7 is a bottom view of base block 9, showing the permanent conductors interconnecting the screw and pin terminals and the leaf springs mounted therein.

The several screw terminals and pin-socket terminals mounted in base block 9, together with downwardly extending terminals of hookswitch 10, are interconnected within the hollow back portion of the base block, as shown in Fig. 7. The interconnection is accomplished by preformed conducting strips 47 received within the prongs of the bifurcate terminal ends. The form of the bifurcate terminal ends of the screw terminals is as illustrated in Figs. 3A and 3B for screw terminal 30; the bifurcate end of the pin-socket terminals is as illustrated at 52 in Fig. 9; and the bifurcate terminals of the leaf springs in hookswitch 10 are shown at 49 in Fig. 12.

A feature of the invention is that base block 9 is so formed as to be readily molded, of an insulating plastic material, with no metal inserts whatever. As molded, base block 9 contains openings for the three screws 40 (Fig. 3) which secure block 9 to base plate 7. Recesses 38 and 39 laterally receive handset cord 5 and line cord 6, incoming through marginal slots in housing 2 (Fig. 1). The metal fasteners customarily secured to cords such as 5 and 6 (Fig. 2) are conveniently secured under the heads of the two mounting screws 40 which lie within recesses 38 and 39.

Figure 9:
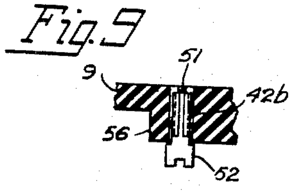
Figure 13:
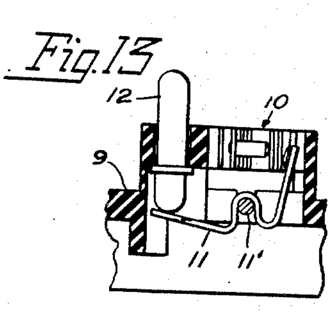
Fig. 13 is a fragmentary view, partially in section, showing the arrangement assembled in base block 9 for controlling hookswitch 10.

As is indicated best by comparison of Figs. 2, 9, and 13, the base block 9 has the entire back portion recessed to form a downwardly opening cavity within which the local interconnecting conductors 47 are supported, by the pronged terminal ends to which they are attached, within the confines of the base block and in spaced relation to the base plate 7 on which the block is mounted. The pronged terminal ends to which interconnecting conductors 47 attach all lie in the same general horizontal plane, except those of double-screw terminal 37 which is mounted at a higher level to permit conductor 47′ to pass freely above the interconnecting conductors 47 which it crosses.

*Screw terminals*

Base block 9 has openings formed therein for receiving individually the several screw terminals 21 to 37. Each such opening is in the form of a rectangular shaft having a width sufficient to receive the downwardly extending end portions of the concerned screw terminal, but of insufficient width to permit the wider horizontal main portion of the screw terminal to pass through. The opening for receiving double-screw terminal 30 is shown in fragmentary sectional view 3A. Fig. 3B shows that this opening is wide enough to receive the terminal ends 53, but of insufficient width to receive the main horizontal portion of the screw terminal. Outwardly pointed barbs 54 (Figs. 3A and 3B) engage the under surface of base block 9 to hold screw terminal 30 securely in its installed position. The material of which the screw terminal is made preferably has sufficient spring action that barbs 54 cause a slight inward compression of terminal ends 53 as terminal 30 is being forced downwardly into its illustrated installed position, followed by an outward snap action to the illustrated locked position. Such a terminal can be readily removed by first compressing end members 53 together sufficiently to clear barbs 54, followed by a withdrawal of the terminal. Similar openings, but of a reduced length, are provided for single-screw terminals such as 21, 22, etc. A single barb such as 54 suffices to retain a single screw terminal in place. A portion of the opening in block 9 for removably receiving single-screw terminal 36 is shown in Fig. 3 below the broken-away end portion of terminal 36. All the openings for the screw terminals can be seen from below in Fig. 7, with the screw terminals in place.

*Pin-socket terminals*

Suitable openings in base block 9 are provided for each of the pin-socket terminal groups 41, 42, and 43. The wall of the base block is thickened at regions 55, 56, and 57 (Fig. 9) by formations which may be described as dependent bosses. The extent of boss 56 is shown in cross-section in Fig. 9. This thickening of the wall permits a satisfactory support length for the pin-socket terminals not required for the screw terminals.

Figure 8:
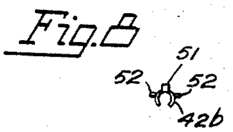
Figs. 8 and 9 show how the pin-socket terminals are constructed and held in place in base block 9.

All of the pin-socket terminals may be of the same construction. Pin-socket terminal 42*b* of Figs. 2, 3, and 7 is shown separately in top view in Fig. 8, and is shown in Fig. 9 as seen from the side. This terminal has the general form of a split tube which lies within its opening in base block 9. The top end of the tube is provided with a laterally extending positioning tab 51 formed integrally therewith. In assembled position, tab 51 lies in a positioning recess formed adjacent to the top end of the opening through part 9, thereby fixing the position of the pin-socket terminal rotationally to conform to the predetermined direction of the concerned portion of the conductor 47 (Fig. 9) which is to be received between the prongs of its bifurcate end portion 52. End portion 52, formed integrally with the remainder of the terminal 42*b*, is wider than the opening through base block 9. Parts 51 and 52 cooperate to prevent withdrawal of the terminal from its installed position. To enable the pin-socket terminal of Figs. 8 and 9 to be installed and secured in place, it can be formed with part 52 originally curled sufficiently to pass downwardly through the opening in the base block, following which it is flattened to increase its width to prevent withdrawal. In the event that such a terminal requires to be removed, this can be accomplished readily by again curling part 52 sufficiently to permit it to be withdrawn. Alternatively, part 52 can be bent back and forth until it breaks to permit the remainder of the pin-socket terminal to be withdrawn for replacement by a new one. Preferably, the opening through which the pin-socket terminals pass are substantially larger than the pin-socket terminal so as to permit expansion of the pin-socket terminal when it grippingly receives a pin terminal, and also to permit substantial lateral displacement of any pin-socket terminal to accommodate variations in the relative locations of several pins which are to cooperate with a group of the pin-socket terminals.

*The hookswitch*

Base block 9 has the illustrated large, generally oblong, vertical opening through the wall thereof for accommodating hookswitch 10. The upper portion of this opening is surrounded by a wall as shown best in Fig. 2. This wall has an opening in one side to accommodate the portion of the hookswitch assembly adjacent the heads of screws 61 (Fig. 3), and is slotted on the opposite side to receive the protruding ends of screws 61 (see Fig. 10) to enable the preassembled hookswitch to be clamped in place by a pair of shoulder nuts 62, slotted to permit them to be tightened and loosened by an ordinary screw driver. The opening containing hookswitch 10 is preferably provided with a removable cover (not shown) for keeping dust and other foreign particles from falling into the contacts of the hookswitch.

Figure 10:
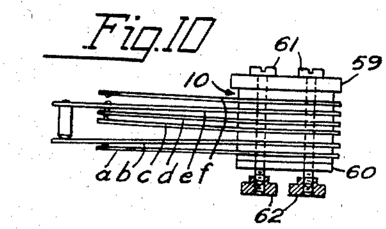
Figs. 10 to 12 show the construction and arrangement of hookswitch 10 of Figs. 2, 3, and 7.
Figure 11:
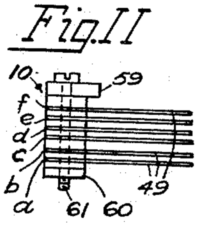
Figure 12:
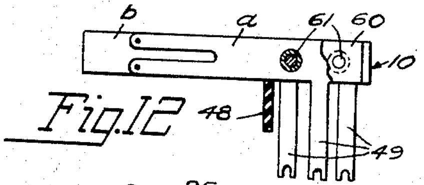

Referring to Figs. 10 to 12, the hookswitch is shown removed from the base block. It includes six leaf springs *a* to *f* supported and adjusted to make contact as shown when the handset is removed from the cradle. As will be subsequently explained, when the handset is placed on the cradle, the free end of the hookswitch is moved to the left to cause leaf springs *a* and *b* to break contact with each other; to cause leaf springs *c*, *d*, and *e* to break contact with each other; and to cause leaf springs *e* and *f* to make contact. For this purpose, leaf springs *b* and *e* are interconnected by an insulating bushing, as shown.

The leaf springs are held in assembled position by the pressure applied by two screws 61 acting to clamp the leaf springs and their illustrated apertured insulating plates between clamp plates 59 and 60. Plate 60 is threaded to receive screws 61, which pass freely through openings in plate 59, as well as through the intervening parts.

One important feature of the hookswitch 10 is that each of the leaf springs is provided with a downwardly extending tab 49 having a bifurcate terminal end to receive the concerned one of conductors 47 (Fig. 7) within the cavity contained in the hollow back portion of block 9. It is to be noted that the side tabs of the leaf springs are provided in pairs, each pair being disposed at a different location along the clamped portion of the springs to enable the concerned conductors 47 (Fig. 7) to make contact with them when arranged in the orderly manner shown in Fig. 7.

As seen in Figs. 7 and 12, the opening in base block 9 which receives hookswitch 10 is provided with a supporting bridge 48 on which hookswitch 10 rests at a point just forward of the front pair of downwardly extending terminal tabs. This bridge is useful in locating the hookswitch horizontally in the desired location prior to the tightening of retaining nuts 62.

*Hookswitch control*

The arrangement for operating hookswitch 10 between its illustrated talking position and its alternate normal position (with *a*, *b* and *c*, *d*, *e* open, and *e*, *f* closed) is illustrated best in Fig. 13, examined in conjunction with Figs. 2, 3, and 6. A transverse opening is provided below the free end of the hookswitch, providing a pair of slots in which the ends of pivot pin 11′ are supported across the opening, as seen in Figs. 3 and 13.

During assembly, pivot pin 11′ is first dropped in place, and the shouldered actuating plunger 12 is inserted from below and temporarily held in place, as by hand. Bell-crank lever 11 is next dropped in place over pin 11′, following which hookswitch 10 may be installed to retain parts 11, 11′, and 12 in position without further fastening means. The end of the generally vertical arm of bell crank 11 is arranged so as to engage the free end of leaf spring *b* of hookswitch 10, on assembly of the parts, and displace it slightly toward its normal (handset-on) position so as to urge plunger 12 upwardly with the shoulder thereof snugly in contact with the surrounding under surface of base block 9. The hookswitch is then in its illustrated alternate (handset-off) condition.

When the housing is finally assembled, and handset 4 is placed in its cradle as shown in Figs. 1 and 6, plunger 1 in the housing (in longitudinal alignment with plunger 12 carried by the base) is depressed under the weight of the handset, thereby depressing plunger 12 and rotating bell crank 11 about pivot pin 11'. The free end of the hookswitch is thereby moved to the left as seen in Fig. 13, and upwardly as seen in Fig. 10, to bring the hookswitch to its normal position. The hookswitch returns to its illustrated alternate position responsive to any subsequent removal of the handset.

*Conductors 47*

As shown best in Fig. 7, it will be noted that each interconnecting conductor 47 comprises a preformed strip, such as may be punch-formed from sheet material. In practice, all of the conductors 47 may be punch-formed from a single sheet about the size and shape of base block 9 and left connected together in the form of a grid until after they have been placed in position. Thereupon, the bifurcate terminal portions of the depending terminal members, such as 53 of Fig. 3B, 52 of Fig. 9, and 49 of Fig. 12, can be crimped inwardly to mechanically retain conductors 47 in place. Each concerned terminal connection is preferably soldered to enhance its permanency. The grid may be cut through before or after the soldering operation to divide it into the separate conductors 47 shown in Fig. 7. The single cross-over conductor 47' may comprise a piece of wire secured between screw terminals 31 and 37 as shown.

*Condenser and coil blocks*

Upon referring to Figs. 4 and 5 in connection with Figs. 2 and 3, it will be observed that the condenser and coil blocks 13 and 14—LB are of similar construction except that condenser block 13 is somewhat longer because of the increased volume of the enclosed condensers as compared to the induction coil. Each block is in the form of a two-piece container, the lower section of which is provided with pin terminals shown at 44 for condenser block 13 and at 45 for coil block 14—LB. The lower portion of the block is provided with an overhanging shelf through which the pin terminals 44 or 45 protrude. The protruding ends of these terminals cooperate with pin-socket terminals 41 or 43 as the case may be. Condenser block 13 has five terminals for cooperation respectively with pin-socket terminals *a* to *e* in group 41, while coil block 14—LB has seven pin terminals for cooperation respectively with pin sockets *a* to *g* of group 43. The inner end of each pin 44 or 45 is formed as shown for one such pin 44 in Fig. 4 to receive one or more internal terminal conductors. Preferably, after the condenser assembly, or the induction coil, as the case may be, has been placed in the lower section of the concerned one of the two blocks, and has had its terminal leads connected to the inner end of the terminal pins, the block is filled within an insulating compound surrounding the condenser or coil, following which the upper portion of the block is assembled and is secured in place as by cement. The finished block (13 or 14—LB) is thus sealed against the entrance of moisture into the electrical apparatus contained therein. As shown best in Fig. 2, observed in conjunction with Figs. 4 and 5, each of the blocks 13 and 14—LB lies partly opposite the forward edge of base block 9 and partly overhangs the base block. Either such block is placed in assembled position by bringing it vertically downward into the position shown, with its pins (44 or 45) entering the pin sockets (41 or 43 as the case may be). It will be observed that the left-hand portion of base block 9 is narrower from front to rear than the remainder thereof so as to accommodate the somewhat greater length of condenser block 13.

The pin terminals (44 or 45) of either of the blocks under discussion are rather widely spaced to conform with the spacing of the concerned pin-socket terminals 41 or 43 (Fig. 3). As a result, each of the two blocks is held reliably in place by the gripping action of the pin socket on its terminal pins, rendering additional securing means unnecessary. A special feature of this arrangement is that when the base assembly is incorporated in the complete set, the housing 2 (Figs. 1 and 6) serves to retain blocks 13 and 14—LB in place in the event that they should tend to be jarred out of position during shipment in an upside-down condition, as may occur. This feature results from the disclosed location of blocks 13 and 14—LB parallel to the longer sides of the base plate 7 and below the abutments formed in the housing 2 where the enlarged base portion thereof gives way to the narrower pedestal portion which terminates in the handset cradle.

Upon referring to Fig. 18, for example, it is seen that condenser block 13 contains single-section condenser 62 employed in the talking circuit and double-section condenser 63 employed in the ringer circuit, and that block 14—LB contains a local-battery induction coil having windings 74 to 77, which encircle the central leg of a common iron core 14' (Fig. 5), in accordance with the usual practice.

*Local-battery set*

Fig. 18 shows a wiring diagram of the disclosed basic assembly as employed in a local-battery telephone set. The apparatus shown in Fig. 18 is generally the apparatus shown in Fig. 2. The handset 4 is connected to the base assembly by cord 5, and the terminal block 18—T is connected thereto by line cord 6. A local battery 18—B is connected to the upper and lower terminals of block 18—T, between conductors L1 and B2 in line cord 6, to supply energizing current for transmitter T in handset 4. Additionally, retard coil 64 is connected between terminals 28 and 33 to equip the set for common-battery signaling, as will be discussed hereinafter.

As previously noted, the local-battery set shown in Figs. 18 and 19 is equipped for common-battery signaling by retard coil 64 being bridged between terminals 33 and 28. This retard coil has not been shown in the mechanical portion of the drawings. In practice, it may be mounted on the base assembly by a bracket secured under the screw of spare terminal 27.

In Fig. 18 the base block 9 and other parts are shown in top view as they appear in Figs. 2 and 3. Accordingly, the interconnecting conductors 47 of Fig. 7 are invisible because contained in the hollow back portion of the base block. This fact is indicated in Fig. 18 by showing the several conductors 47 as alternately heavy and light chained lines. These conductors form the permanent wiring of the set and are shown extending to their respective terminals in the normal manner. The other conductors (those in cords 5 and 6, ringer conductors 16, and retard-coil conductors 65) constitute the removably connected conductors. They are consequently shown terminating at base block 9 in arrow-heads to assist in relating the wiring diagram to the physical equipment which it represents. Similarly, the pin-terminals (groups 44 and 45) and links 18 to 20 are provided with arrow-heads at the points where they respectively attach to fixed terminals of base block 9.

Fig. 19 shows the apparatus of Fig. 18 rearranged in circuit-schematic form to enable the circuit arrangement of the local-battery set to be understood more readily. The several conductors 47, comprising the permanent wiring of the set, are here shown as heavy solid lines, to more readily differentiate them from the removably connected conductors, links, and pin terminals.

As previously noted, both the local-battery set and the common-battery set are arranged for what is commonly termed anti-sidetone operation. To this end, the local-battery induction coil contained in block 14—LB is provided with a balance winding 75 and an artificial-line resistor 76, in addition to primary winding 77 and secondary winding 74. Windings 74 to 76 are bridged across conductors L1 and L2 in series with condenser 62 in block 13 and hookswitch springs 10*c*, 10*d*, and 10*e*, in talking position. This bridge further includes pin terminals 45*c*, 45*b*, 45*d*, and 45*a* of block 14—LB; pin terminals 44*b* and 44*e* of block 13; and link 20 which connects terminals *a* and *c* in calling-device group 42 (Figs. 3, 7, and 18).

Receiver R of the handset is connected between the junction of coil windings 75 and 74 and conductor L1 in line cord 6, through hookswitch springs 10*a* and 10*b*, and 10*d* and 10*e*. The receiver R is thus in bridge of the artificial-line resistor 76 and its supply coil 75, whereby the receiver RE carries no current during transmission from the illustrated set so long as the line to which conductors L1 and L2 extends is balanced by the artificial-line resistor 76, according to the relative number of turns of secondary windings 74 and 75. To the extent that a perfect balance does not exist, current flows through the receiver R during transmission from the local set, as is common with commercially produced telephone sets of this so-called anti-sidetone type.

In the talking condition illustrated in Fig. 19, current is flowing through the transmitter T from local battery 18—B. The supply path may be considered as over conductor B2 in line cord 6, through primary winding 77 in the induction-coil block 14—LB, and transmitter conductor TR in cord 5. The return path is then the one over common conductor C in cord 5, contact springs 10*d* and 10*e* of the hookswitch, and line conductor L1 in cord 6. It will be noted that the supply path to transmitter T further includes screw terminals 36, pin terminals 45*g* and 45*e* of block 14—LB, screw terminal 35, three-position link 19 in its illustrated first position, and screw terminals 34 and 21. In the local-battery set, link 19 must be used invariably in its first position shown in Figs. 18 and 19, the other two positions being used only in the common-battery set, to be subsequently described in more detail.

With retard coil 64 incorporated in the circuit as shown in Figs. 18 and 19, closure of the hookswitch contacts 10*c*, 10*d*, and 10*e*, responsive to the removal of the handset, bridges the retard coil across line conductors L1 and L2 through link 20. A direct-current signalling path is thus closed in the manner common to common-battery systems. The principal utility for this arrangement is in a common-battery system on lines which are so long, or the resistance is otherwise so great, that a satisfactory flow of transmitter current cannot be obtained thereover. The common-battery signalling feature is retained, but the transmitter is supplied with current from the local battery 18—*b* as previously pointed out. However, it is contemplated that most local-battery sets will not be equipped with coil 64, but will employ magneto signalling by means of a hand generator connected to the line through leads 97.

When common-battery signalling is employed, it will be noted that condenser 62, being interposed between coil winding 74 and conductor L2, prevents direct current from flowing through coil windings 74 and 75 and through receiver R. The path of the signalling direct current is thus confined to the bridge through retard coil 64. The condenser 62 is also of utility when the local-battery set of Figs. 18 and 19 is used (without retard coil 64) in a system employing magneto signalling. It prevents stray direct currents (furnished for example through certain special cord circuits in the exchange) from flowing through the windings of the induction coil and the receiver, thereby avoiding such harmful effects as these currents might produce in apparatus designed to operate free therefrom. Additionally, condenser 62 limits the flow of the relatively low-frequency ringing currents from the central office or from other subscriber stations on the same line, thereby permitting a desired subscriber station to be signalled notwithstanding the fact that the hand telephone may be removed at one or more other stations on a party line.

Contacts 10*a* and 10*b* have a common purpose in all contemplated circuit embodiments, both local-battery and common-battery. Such contacts are preferably adjusted to engage last when the handset is removed and to disengage first when the handset is replaced. These contacts thus immediately open-circuit receiver R when the handset is replaced to prevent clicks in the receiver incident to the subsequent opening of the transmitter circuit at contacts 10*d* and 10*e*. When the receiver is removed, the transient condition tending to cause a clicking in the receiver R incident to the closure of the transmitter circuit, or of the signalling circuit, at contacts 10*d* and 10*e* are given time to subside before contacts 10*a* and 10*b* place the receiver R in circuit.

When the local-battery set of Figs. 18 and 19 is equipped as shown for common-battery signalling, hookswitch contacts 10*a* and 10*b* prevent a normal flow of signalling current (with the handset replaced) between conductors L1 and L2 in a bridge path including battery 18—B, primary winding 77, transmitter T, receiver R, windings 75 and 76, and retard coil 64.

As appears clearly in Fig. 19, when the hookswitch is in normal position, ringer 15 is connected to line conductor L1 through contacts 10*e* and 10*f* and condenser 63. With two-position link 18 in its illustrated first position, the lower terminal of ringer 15 is connected to ground over contactor G in line cord 6. This is the ringer connection employed for so-called divided ringing, used when the ringers at certain subscriber stations on a party line are connected between one line conductor and ground, and the ringers at the other stations are connected between the opposite line conductor and ground. The line conductors are connected in what may be considered the normal way to the line terminals of strip 18—T at one group of stations on party lines and are connected in what may be termed the reverse way to the line terminals of strips 18—T at the other stations on the line, whereby the application of ringing current at the central office to one line conductor or the other affects the ringers at one group of stations or the other.

When bridged ringing is desired link 18 is shifted to its second position (Fig. 15), wherein it connects screw terminal 31 with screw terminal 30 instead of with screw terminal 32, thereby bridging the ringer circuit across conductors L1 and L2.

With condenser link 17 in its illustrated first position, both sections of condenser 62 are employed in the ringer circuit to provide full condenser capacity where required. When only the capacity of the upper section of condenser 63 is required, link 17 is shifted to its second position (Fig. 14), wherein it does not bridge screw terminals 24 and 25. It may be noted that systems employing selective signalling on party lines by the use of ringing currents of separate frequencies and tuned ringers 15, two condenser capacities are customarily provided, one or another of which is used at a subscriber station according to the signalling frequency assigned thereto. The disclosed switching arrangement involving the two-section condenser 63 and link 17 enables a telephone set incorporating the illustrated base block 9 and condenser block 13 to be readily adapted for use at any one of a large number of subscriber stations. In those cases requiring condenser capacities not obtainable with condenser block 13, such block can be readily withdrawn from its installed location and replaced with a similar condenser block containing a condenser 63 having sections of a desired other capacity.

When the local-battery set of Figs. 18 and 19 is equipped with retard coil 64 to adapt it for common-battery signalling, it serves as an automatic telephone set by merely removing link 20 to enable a calling device to be "plugged in," as shown in Fig. 20 for the common-battery set.

*Common-battery set*

In Figs. 20 and 21, the basic arrangement is shown equipped as a common-battery set (instead of as a local-battery set according to Figs. 18 and 19) by being supplied with common-battery induction-coil block 14—CB in place of induction-coil block 14—LB used in the local-battery set of Figs. 18 and 19. Block 14—CB may have the same physical dimensions as block 14—LB, and is provided with a group of pin terminals 45′, comprising terminals *a* to *g* which fit respectively into the same pin-socket terminals *a* to *g* of group 43, occupied in Fig. 18 by the pin terminals 45 of block 14—LB.

In the common-battery modification shown in Figs. 20 and 21, local battery 18—B of Fig. 18 is omitted and the unneeded conductor B2 in line cord 6 is disconnected from screw terminal 36 and left unused. Moreover, retard coil 64 of Figs. 18 and 19 is never required in the common-battery set, as it is used only in the local-battery set, to adapt it for common-battery signalling.

The common-battery set shown in Fig. 20 is further illustrated as adapted for use as an automatic telephone set. This adaptation is accomplished by removing link 20 of Figs. 3, 18, and 19, and placing the four-pin calling-device plug 68 in the pin-socket terminals 42*a* to 42*d* as indicated in Fig. 20. This plug is connected, by the four-conductor cord 70, to calling device 71, which may be mounted in housing 2 of Fig. 1 in the position occupied therein by the removable blank 3.

The common-battery set, shown in wiring-diagram form in Fig. 20, is shown in circuit-schematic form in Fig. 21, to enable the circuit arrangement thereof to be more readily understood. Upon reference to Fig. 21, it will be observed that the circuit elements of the common-battery set are related to each other in the same way that they are in the local-battery set with the exception that the common-battery coil block 14—CB is provided with an induction coil having a specifically different arrangement of coil windings which are connected respectively to the concerned pin terminals 45′ to provide the different circuit arrangement required for the common-battery set. A comparison of Figs. 19 and 21 shows that condenser 62 in condenser block 13 is connected at a point between line conductor L1 and the repeating coil windings in Fig. 21, whereas it is connected on the opposite side of the repeating-coil windings in Fig. 19, between such windings and conductor L2. This shift in the location of the condenser is accomplished readily, in the physical arrangement disclosed, by merely connecting the pin terminals of each of the blocks 14—LB and 14—CB internally according to the desired circuit arrangement. It is made possible by the fact that both terminals of condenser 62 are carried to pin-socket terminals engaged by pins of whichever one of the coil blocks is inserted. The respective correspondence between the pin terminals of block 14—CB and block 14—LB are shown by the assignment of the same reference characters in both cases, except that the numerical part of the reference character assigned to any pin terminal of block 14—CB is primed.

A further shift between the local-battery set and the common-battery set is in the relative circuit positions occupied by the transmitter and the receiver. In the local-battery set, the transmitter is in a local circuit (including winding 77), while the receiver is in the local circuit in the common-battery set, including winding 77′. In the common-battery set, the transmitter is connected by way of lead TR and link 19 to a point between the serially related line windings (75′ and 74′), whereas the receiver employs that circuit position in the local-battery set.

With the hookswitch in its talking position illustrated in Figs. 20 and 21, transmitter T is in a direct-current bridge across conductors L1 and L2, which (with calling device 71 in use and with link 19 in the position shown) includes impulse contacts 72 of the calling device, line winding 74′ within induction-coil block 14—CB, non-inductive resistance winding 78, link 19, transmitter T, common cord conductor C, and hookswitch contacts 10*d* and 10*e*.

Transmitter T is shunted by the anti-sidetone arrangement (balance winding 75′ and artificial-line winding 76′) in series with condenser 62, which blocks the flow of direct current through windings 75′ and 76′, confining all of it to the path through transmitter T. This shunt path includes terminals *d*, *b*, and *c* of group 45′, terminals *e* and *b* of group 44, and hookswitch contacts 10*c* and 10*d*.

Receiver R is included in a local circuit with secondary winding 77'. On one side, this local circuit includes terminal pin 45'f of block 14—CB and hookswitch elements 10a and 10b. On the other side, it includes coil-block pin 45'c and hookswitch elements 10c and 10d.

As shown best in Fig. 21, the circuit of the common-battery set includes three circuit branches, or limbs, comprising (1) a natural-line limb, an artificial-line limb, and a transmitter limb. These three limbs are each bridged across two points, comprising (1) the terminal in local line lead L1, and (2) lever arm 19 or the terminal engaged thereby. The transmitter limb is the one including the transmitter T; the natural-line limb includes winding 74' of induction coil 14—CB; and the artificial-line limb of the circuit includes induction-coil winding 75'. The natural line is the telephone line connected to terminals of block 18—T, and the artificial line is the resistor 76', comprising a part of the induction coil 14—CB.

When transmitter T is operated to vary the current flow therethrough, a voltage variation is thereby produced across line conductors L1 and L2 in the well understood manner. Artificial-line resistor 76', being arranged to generally balance the impedance of the line to which the subset is connected, in view of the turn ratio chosen for coils 75' and 74', permits sufficient current to flow through winding 75' and condenser 62 to substantially balance the variations in current flow through line winding 74', thereby preventing the local receiver winding 77' from being affected, except to the extent of such unbalance as exists. When incoming voice currents arrive over conductors L1 and L2, all such currents pass through line winding 74' and resistor 78. From this point, they divide, a part of them flowing through transmitter T and a part of them continuing through windings 75' and 76' and condenser 62 to the other side of the talking circuit. At this time, the current flow through windings 75' and 74' is in aiding relationship, whereby local winding 77' is influenced to drive current through receiver R, in the manner common to anti-sidetone substation circuits of the character illustrated.

When, following removal of the handset, the usual dial (not shown) of calling device 71 is turned off-normal incident to the setting thereof for the transmission of a desired number of impulses (interruptions of contacts 72) on the return movement, shunt contacts 73 close and remain closed until the dial returns to normal position, following the delivery of the last impulse of the series. The inner one of contacts 73 is connected to the lower line conductor, as extended through contacts 72 to the lower terminal of winding 74'. The outer one of contacts 73 is connected, through pin terminal 68d and pin-socket terminal 42d to the upper talking conductor, by way of hookswitch contacts 10d and 10e. Accordingly, the substation devices normally in circuit across the talking conductors are shunted out when contacts 73 close together. The middle one of the three shunt contacts 73 is connected to receiver lead RE through pin terminals 68b and socket terminal 42b.

The outer and middle contacts 73 close together first as the previously mentioned dial is turned from its normal condition, thereby first shunting the receiver R. Accordingly, the current changes incident to the principal shunting operation are prevented from affecting the receiver R. On the completion of the return movement of the dial of calling device 71, the inner and middle ones of the shunt contacts 73 open first, thereby reestablishing normal conditions in the telephone set prior to the opening of the middle and outer contacts 73 to again place the receiver R effectively in circuit.

The common-battery set is illustrated in Figs. 20 and 21 with the three-position link 19 therein placed in its first position between screw terminals 34 and 35. This is the position intended when the line leading to the substation is a relatively short, or low-resistance, line. With link 19 in its illustrated first position, resistance winding 78 is in circuit with the relatively short line. This has two useful purposes. First, it increases the effective natural line resistance to a point toward the assumed resistance value for which the artificial-line resistor 76' is calculated, thereby helping to bring the short line up toward a balanced condition for better anti-sidetone operation. Second, resistor 78 reduces the current flow through transmitter T, thereby decreasing its otherwise undesirably high output, and also materially increasing its otherwise short useful life.

When the common battery set of Figs. 20 and 21 is to be used on a line of medium length, link 19 is then transferred to its second or intermediate position shown in Fig. 16. In this position, it joins screw terminals 34, 35, and 36 together in common, thereby eliminating resistor 78 from the circuit. The artificial line of the set is preferably designed to give the best anti-sidetone performance when the telephone set is connected to a line of medium length without artificial resistance added thereto.

When the telephone set of Figs. 20 and 21 is to be used on a long line, link 19 is transferred to its third position as shown in Fig. 17. It then interconnects screw terminals 34 and 36 and is out of contact entirely with screw terminal 35. In this position of link 19, resistor 78 is entirely out of the line circuit over which transmitter T is supplied with talking current, and is effectively in series with artificial-line resistor 76', adding its resistance to the resistance of the latter. The thus increased artificial-line resistance enables the circuit to perform more efficiently as an anti-sidetone circuit, and as an efficient transmitting and receiving circuit, in conjunction with the long line to which the set is connected.

In the common-battery set of Figs. 20 and 21, condenser link 17 and ringer link 18 are shiftable between their illustrated and alternate positions for the purposes set forth in connection with the local-battery set of Figs. 18 and 19.

Upon referring to Figs. 7, 18, and 20, it will be observed that screw terminal 27 has no conductor connected thereto. This spare terminal is provided in base block 9 to form a convenient connection point for circuit arrangements which may be considered special, as for example circuit arrangements employing a cold-cathode discharge tube in circuit with ringer 15, as when inductive disturbances are to be minimized on party lines employing divided ringing.

I claim:

1. A substation telephone set including a plurality of elements consisting of a pair of line leads, a transmitter, a receiver, and an induction coil, means for interconnecting said elements in a common-battery anti-sidetone talking circuit, said circuit having a natural-line limb and an artificial line-limb, an impedance element, and means including terminal facilities for enabling the impedance element to be included in either of said limbs to the exclusion of the other and to be excluded from both.

2. A substation telephone set including a plurality of elements consisting of a pair of line leads, a transmitter, a receiver, and an induction coil, means for interconnecting said elements in a common-battery anti-sidetone talking circuit, said circuit having a transmitter limb and an artificial line-limb, an impedance element, and means including terminal facilities for enabling the impedance element to be included in either of said limbs to the exclusion of the other.

3. A substation telephone set including a plurality of elements consisting of a pair of line leads, a transmitter, a receiver, and an induction coil, means for interconnecting said elements in a common-battery anti-sidetone talking circuit, said circuit having a natural-line limb and an artificial line-limb, an impedance element, and means including terminal facilities for enabling the impedance element to be included in the natural-line limb and to be excluded therefrom.

4. A substation set including a plurality of elements consisting of a pair of line leads, a transmitter, a receiver, and an induction coil, means for interconnecting said elements in a common-battery anti-sidetone talking circuit, said circuit having a natural-line limb and an artificial-line limb in series with each other between said line leads, said circuit further having a transmitter limb connected at one end to the line lead to which the artificial-line limb is connected, an impedance element connected in series between the first said limbs, and means including terminal facilities enabling the other end of the transmitter limb to be connected to either side of said impedance element to the exclusion of the other, and enabling it to be connected to both sides of the impedance element.

5. A substation set including a plurality of elements consisting of a pair of line leads, a transmitter, a receiver, and an induction coil, means for interconnecting said elements in a common-battery anti-sidetone talking circuit, said circuit having a natural-line limb and an artificial-line limb in series with each other between said line leads, said circuit further having a transmitter limb connected at one end to the line lead to which the artificial-line limb is connected, an impedance element connected in series between the first said limbs, and means including terminal facilities enabling the other end of the transmitter limb to be connected to either side of said impedance element to the exclusion of the other.

6. A substation set including a plurality of elements consisting of a pair of line leads, a transmitter, a receiver, and an induction coil, means for interconnecting said elements in a common-battery anti-sidetone talking circuit, said circuit having a natural-line limb and an artificial-line limb in series with each other between said line leads, said circuit further having a transmitter limb connected at one end to the line lead to which the artificial-line limb is connected, an impedance element connected in series between the first said limbs, and means including terminal facilities enabling the other end of the transmitter limb to be connected to the natural-line side of said impedance element to the exclusion of the artificial-line side thereof, and enabling it to be connected to both sides of the impedance element.

7. In combination, (1) a subassembly for a telephone substation set including a transmitter, a receiver, a hookswitch, a pair of line terminals, and a group of circuit-completing terminals, conductors suitably interconnecting the named circuit elements according to a general, but incomplete, substation circuit arrangement, and (2) alternative induction-coil arrangements, each such arrangement including an induction coil having specifically different characteristics, and including a group of conductor terminals physically arranged to correspond respectively to the terminals in said circuit-completing group and arranged to be connected respectively thereto, one induction-coil arrangement, when applied, completing the subassembly as a local-battery telephone substation set, the other induction-coil arrangement, when applied, completing the subassembly as a common-battery telephone substation set.

8. In combination, (1) a subassembly for a telephone substation set including a transmitter, a receiver, a hookswitch, a pair of line terminals and a group of circuit-completing terminals, conductors suitably interconnecting the named circuit elements according to a general, but incomplete, substation circuit arrangement, and (2) first and second induction-coil devices each such device including a multi-winding induction coil, and including a group of terminals physically arranged to correspond respectively to the terminals in the said circuit-completing group and arranged to be connected respectively thereto, each induction-coil device having its winding ends differently represented by terminals in its said group, one induction coil device, when applied, completing the subassembly as a local-battery telephone substation set, the other induction-coil device, when applied, completing the subassembly as a common-battery telephone substation set.

9. A standardized arrangement for a telephone substation set including a transmitter, a receiver, a talking condenser, a pair of line terminals, and a group of circuit-completing terminals, standardized relatively permanent wiring interconnecting the named circuit elements according to a general, but incomplete, substation circuit arrangement, the circuit-completing terminals including a first pair of terminals connected to the line conductors respectively, a second pair connected to the receiver and transmitter respectively, a third pair connected respectively to the elements of said talking condenser; first means for interconnecting said circuit-completing terminals in one way to provide a local-battery telephone substation set, said first means including a bridge across the line conductors including serially related induction-coil windings and further including a connection from said receiver terminal to a tap point in such bridge between said induction-coil windings, said first means serving to connect said talking condenser serially in said bridge between one line conductor and the said tap point, said first means further including a local-induction-coil winding connected at one end to said transmitter terminal; and a second means for interconnecting said circuit-completing terminals in another way to provide a common-battery telephone substation set, said second means including an induction-coil bridge across the line conductors including serially related induction-coil windings and further including a connection from said transmitter terminal to a tap point in such bridge between the said induction coil windings therein, said second means serving to connect said talking condenser serially in the last said bridge between the other line conductor and the last-named tap point, said second means further including a local induction-coil winding connected at one end to said receiver terminal.

10. A standardized arrangement for a telephone substation set including a transmitter, a receiver, a pair of line terminals, and a group of circuit-completing terminals, standardized relatively permanent wiring interconnecting the named circuit elements according to a general, but incomplete, substation circuit arrangement, the circuit-completing terminals including a first pair of terminals connected to the line conductors respectively, and a second pair connected to the receiver and transmitter respectively; first means for interconnecting said circuit-completing terminals in one way to provide a local-battery telephone substation set, said first means including a bridge across the line conductors including serially related induction-coil windings and including a connection from said receiver terminal to a tap point in such bridge between said induction-coil windings, said first means further including a local-induction-coil winding connected at one end to said transmitter terminal; and a second means for interconnecting said circuit-completing terminals in another way to provide a common-battery telephone substation set, said second means including an induction-coil bridge across the line conductors including serially related induction-coil windings and further including a connection from said transmitter terminal to a tap point in such bridge between the said induction coil windings therein, said second means further including a local induction-coil winding connected at one end to said receiver terminal.

11. A telephone substation set including a pair of line terminals, an induction coil, a transmitter, a receiver, and a hookswitch, a lead common to both the transmitter and the receiver connected to one line terminal by way of a contact of the hookswitch, a bridge across the line terminals including serially related windings of the induction coil, said bridge being connected to said one line conductor through a further contact of said hookswitch, a pair of leads individual respectively to the transmitter and receiver, each lead of such pair being connected to a separate point in said induction coil, one such point being between said serially related windings, while the other is to one terminal of a third winding the other terminal of which is connected to one of the line terminals, and a still further contact of said hookswitch connected in series with the said lead individual to the receiver.

12. A telephone substation set including a pair of line terminals, an induction coil, a transmitter, a receiver, and a hookswitch, a lead common to both the transmitter and the receiver connected to one line terminal by way of a contact of the hookswitch, a bridge across the line terminals including serially related windings of the induction coil, said bridge being connected to said one line conductor through a further contact of said hookswitch, a pair of leads individual respectively to the transmitter and receiver, each lead of such pair being connected to a separate point in said induction coil, one such point being between said serially related windings, while the other is to one terminal of a third winding the other terminal of which is connected to one of the line terminals.

13. A telephone substation set including a pair of line terminals, an induction coil, a transmitter, a receiver, and a hookswitch, a lead common to both the transmitter and the receiver connected to one line terminal by way of a contact of the hookswitch, a bridge across the line terminals including serially related windings of the induction coil, a pair of leads individual respectively to the transmitter and receiver, each lead of such pair being connected to a separate point in said induction coil, one such point being between said serially related windings, while the other is to one terminal of a third winding the other terminal of which is connected to one of the line terminals.

JOSEPH F. HOUDEK, Jr.

REFERENCES CITED

The following references are of record in the file of this patent:

UNITED STATES PATENTS

| Number | Name | Date |
|---|---|---|
| 1,471,388 | Dietze | Oct. 23, 1923 |
| 1,901,958 | Gooderham | Mar. 21, 1933 |
| 1,919,314 | Wigan | July 25, 1933 |
| 1,932,647 | Stehlik | Oct. 31, 1933 |
| 2,099,381 | Wigan | Nov. 16, 1937 |
| 2,190,155 | Jones | Feb. 13, 1940 |
| 2,320,726 | Herckman's | June 1, 1943 |
| 2,417,067 | Faralla | Mar. 11, 1947 |

FOREIGN PATENTS

| Number | Country | Date |
|---|---|---|
| 448,143 | Great Britain | June 2, 1936 |